(12) United States Patent
Brandon et al.

(10) Patent No.: US 12,589,713 B2
(45) Date of Patent: Mar. 31, 2026

(54) FLEET-CONNECTED VEHICLE IDENTIFICATION

(71) Applicant: GM Cruise Holdings LLC, San Francisco, CA (US)

(72) Inventors: Jeffrey Brandon, Phoenix, AZ (US); Kenneth Ferguson, Scottsdale, AZ (US)

(73) Assignee: GM Cruise Holdings LLC, San Francisco, CA (US)

( * ) Notice: Subject to any disclaimer, the term of this patent is extended or adjusted under 35 U.S.C. 154(b) by 266 days.

(21) Appl. No.: 18/324,061

(22) Filed: May 25, 2023

(65) Prior Publication Data

US 2024/0391420 A1 Nov. 28, 2024

(51) Int. Cl.
*B60R 25/24* (2013.01)
*B60R 25/30* (2013.01)
*G07C 5/00* (2006.01)
*H04W 4/02* (2018.01)

(52) U.S. Cl.
CPC ............ *B60R 25/24* (2013.01); *B60R 25/307* (2013.01); *G07C 5/008* (2013.01); *H04W 4/025* (2013.01); *B60R 2325/205* (2013.01)

(58) Field of Classification Search
CPC . B60R 25/24; B60R 25/307; B60R 2325/205; G07C 5/008; H04W 4/025
See application file for complete search history.

(56) References Cited

U.S. PATENT DOCUMENTS

| | | | | |
|---|---|---|---|---|
| 8,350,670 B2 * | 1/2013 | Kelly | ................. | B60R 25/2081 |
| | | | | 340/426.36 |
| 9,165,412 B2 * | 10/2015 | Gellatly | ................ | G07C 5/008 |
| 9,896,063 B2 * | 2/2018 | Poma | ................ | G07C 9/00309 |
| 10,319,167 B1 * | 6/2019 | Oesterling | ......... | G07C 9/00896 |
| 10,384,644 B2 * | 8/2019 | Pudar | ................ | G07C 9/00571 |
| 2018/0027504 A1 * | 1/2018 | Matsushita | .......... | H04W 4/029 |
| | | | | 455/456.6 |
| 2019/0001925 A1 * | 1/2019 | Arakawa | ............... | B60W 40/08 |
| 2021/0035201 A1 * | 2/2021 | Gomi | .................... | G06Q 50/40 |

* cited by examiner

*Primary Examiner* — Thomas D Alunkal
(74) *Attorney, Agent, or Firm* — Honigman LLP; Matthew H. Szalach; Jonathan P. O'Brien

(57) ABSTRACT

Systems and methods for providing vehicle information to operators and service people without the use of a tool enabling communication directly between the vehicle and the operator or service person. In particular, systems and methods are provided for receiving a vehicle data request from an operator mobile device application, identifying a vehicle in close proximity to the operator mobile device, obtaining most recent vehicle data, and transmitting the requested vehicle data to the operator mobile device. Additionally, systems and methods are provided for the operator to request various capabilities with respect to the vehicles, such as vehicle access.

18 Claims, 7 Drawing Sheets

402 — CONNECT MOBILE DEVICE TO CENTRAL COMPUTER VIA A FLEET VEHICLE ACCESS APPLICATION

404 — ATTACH THE MOBILE DEVICE TO AN EXTERIOR SURFACE OF A VEHICLE

406 — DETERMINE THE MOBILE DEVICE LOCATION

408 — RECEIVE A VEHICLE DATA REQUEST VIA THE FLEET VEHICLE ACCESS APPLICATION

410 — IDENTIFY THE VEHICLE IN CLOSE PROXIMITY TO THE MOBILE DEVICE

412 — TRANSMIT THE VEHICLE DATA TO THE FLEET VEHICLE ACCESS APPLICATION

414 — DISPLAY THE VEHICLE DATA ON THE MOBILE DEVICE SCREEN

FLEET-CONNECTED VEHICLE IDENTIFICATION

BACKGROUND

1. Technical Field

The present disclosure generally relates to vehicle identification and, more specifically, to determining vehicle identification and disposition.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, ultrasonic sensors, inertial sensor module (ISM), acoustic sensors, amongst others. The sensors perceive the environment around the vehicles and collect massive data and measurements that the autonomous vehicle can use for operations such as control and navigation. The sensors can provide the data and measurements to an internal computing system of the autonomous vehicle, which can use the data and measurements to predict, plan and control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 4 is a flowchart showing a method for fleet-connected vehicle identification, according to some examples of the present disclosure;

DETAILED DESCRIPTION

Figure 1:
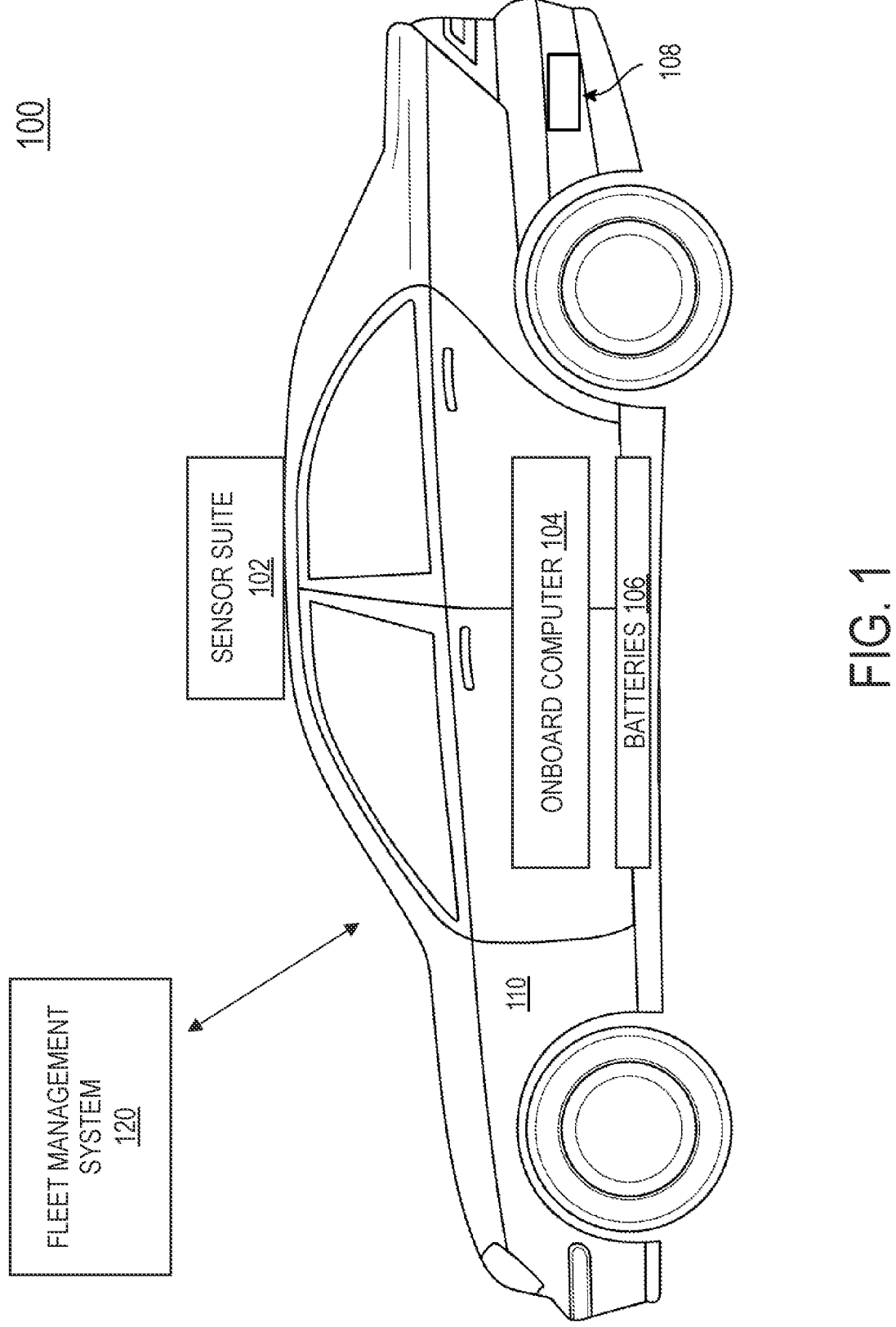
FIG. 1 illustrates an autonomous vehicle connected to a fleet management system, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview

Systems and methods are provided for providing vehicle information to operators and service people without the use of a tool enabling communication directly between the vehicle and the operator or service person. In particular, systems and methods are provided for receiving a vehicle data request from an operator mobile device application, identifying a vehicle in close proximity to the operator mobile device, obtaining most recent vehicle data, and transmitting the requested vehicle data to the operator mobile device. Additionally, systems and methods are provided for the operator to request various capabilities with respect to the vehicles, such as vehicle access. In some examples, the operator can request that a vehicle move within a facility from one parking space or service area to a different parking space or service area.

In traditional systems, when an autonomous vehicle enters a service facility, service personnel need a specialized bespoke tool to communicate directly with the autonomous vehicle and receive vehicle data. In particular, service personnel can use such tools to identify each vehicle and determine any vehicle fault codes, maintenance requests, or other maintenance issues. As autonomous vehicle fleets scale up, operational personnel will encounter vehicles that are in a condition where it isn't possible to quickly ascertain vehicle identification or status of vehicles that await a next activity or service. In many cases, the vehicles will be handled by human personnel that require some basic information to perform their work, such as whether the vehicle is to be moved to a designated location or whether a service should be performed in the space where the vehicle is located. Differentiating among vehicles is further complicated by the identical appearance of the fleet vehicles. Thus, there is a need for more easily available and less expensive systems and methods for service personnel to communicate with the autonomous vehicles and receive autonomous vehicle information.

Thus, provided herein are systems and techniques for a mobile device that is connected to a WiFi and/or cellular service to connect with a back office central computer and receive vehicle information. The back office central computer is connected to the vehicle. The back office central computer can identify the location of the mobile device, and based on the mobile device location and the locations of nearby vehicles, identify the vehicle the mobile device is requesting information about and/or access to. The back office central computer can provide the vehicle information and/or vehicle access to the mobile device. Vehicle information can include vehicle identification number, an intended vehicle destination space, an intended vehicle operational activity, a vehicle battery state of charge, vehicle operational readiness, and vehicle active faults. The vehicle information can act as a status beacon regarding the status of the vehicle. The back office central computer provides a platform for communication between the mobile device and the vehicle.

Example Vehicle for Fleet-Connected Vehicle Identification

FIG. 1 illustrates an autonomous vehicle 110 connected to a fleet management system 120, according to some examples of the present disclosure. The autonomous vehicle 110 includes a sensor suite 102 and an onboard computer 104. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 is part of a fleet of vehicles for picking up passengers and/or packages and driving to selected destinations. In some examples, the autonomous vehicle 110 is a personal autonomous vehicle that is used by one or more owners for driving to selected destinations. In some examples, the autonomous vehicle 110 can connect with a central computer to download vehicle updates, maps, and other vehicle data. The vehicle 110 includes a fleet-connection module 108 for maintaining a connection and communication with a fleet management system 120. The fleet-connection module 108 can include, for example, a transceiver.

The sensor suite 102 includes localization and driving sensors. For example, the sensor suite 102 may include one or more of photodetectors, cameras, RADAR, sound navigation and ranging (SONAR), LIDAR, Global Positioning System (GPS), inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment. In particular, the sensor suite 102 can be used to identify information and determine various factors regarding an autonomous vehicle's environment. In some examples, data from the sensor suite 102 can be used to update a map with information used to develop layers with waypoints identifying various detected items. Additionally, sensor suite 102 data can provide localized traffic information, ongoing road work information, and current road condition information. Furthermore, sensor suite 102 data can provide current environmental information, including current roadside environment information, such as the presence of people, crowds, and/or objects on a roadside or sidewalk. In this way, sensor suite 102 data from many autonomous vehicles can continually provide feedback to the mapping system and a high fidelity map can be updated as more and more information is gathered.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point cloud of the region intended to scan. In still further examples, the sensor suite 102 includes RADARs implemented using scanning RADARS with a dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine the state of the autonomous vehicle 110. In some examples, the onboard computer 104 checks for vehicle updates from a central computer or other secure access points. In some examples, the onboard computer 104 performs real time diagnostics of circuit boards in the vehicle. In some examples, the onboard computer 104 performs real time diagnostics of signal transmissions in the vehicle. In some examples, a vehicle sensor log receives and stores processed sensed sensor suite 102 data from the onboard computer 104. In some examples, a vehicle sensor log receives sensor suite 102 data from the sensor suite 102. In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. In some examples, the interior sensors can be used to detect passengers inside the vehicle. Additionally, based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine the states of the autonomous vehicle. In some implementations, the onboard computer 104 is a general purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles. In some examples, the onboard computer 104 and the fleet-connection module 108 communicate with a fleet management system 120. The onboard computer 104 can transmit to the fleet management system vehicle status information such as the vehicle battery charge level, vehicle tire pressure, vehicle maintenance issues, vehicle location, etc. In some examples, the onboard computer 104 periodically transmits a vehicle log to the fleet management system including current vehicle data.

According to various implementations, the autonomous driving system 100 of FIG. 1 functions to enable an autonomous vehicle 110 to modify and/or set a driving behavior in response to parameters set by vehicle passengers (e.g., via a passenger interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, a bicycle, a scooter, a tractor, a lawn mower, a commercial vehicle, an airport vehicle, or a utility vehicle. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

The fleet management system 120 manages a fleet of autonomous vehicles such as the autonomous vehicle 110. The fleet management system 120 may manage one or more services that the fleet of autonomous vehicles provides to users. An example service is a ride service, e.g., an autonomous vehicle 110 provides a ride to a user from a first location to a second location. Another example service is a delivery service, e.g., an autonomous vehicle 110 delivers one or more items from or to the user. The fleet management system 120 can select one or more autonomous vehicles (e.g., autonomous vehicle 110 to perform a particular service, and instructs the selected autonomous vehicle to drive to one or more particular locations associated with the service (e.g., a first address to pick up a first user, and a second address to pick up second user). The fleet management system 120 also manages fleet maintenance tasks, such as fueling, inspecting, and servicing of the autonomous vehicles. As shown in FIG. 1, the autonomous vehicle 110 communicates with the fleet management system 120, and may communicate via the fleet connection module 108. The autonomous vehicle 110 and fleet management system 120 may connect over a network, such as the Internet.

Example System for Fleet-Connected Vehicle Identification

Figure 2:
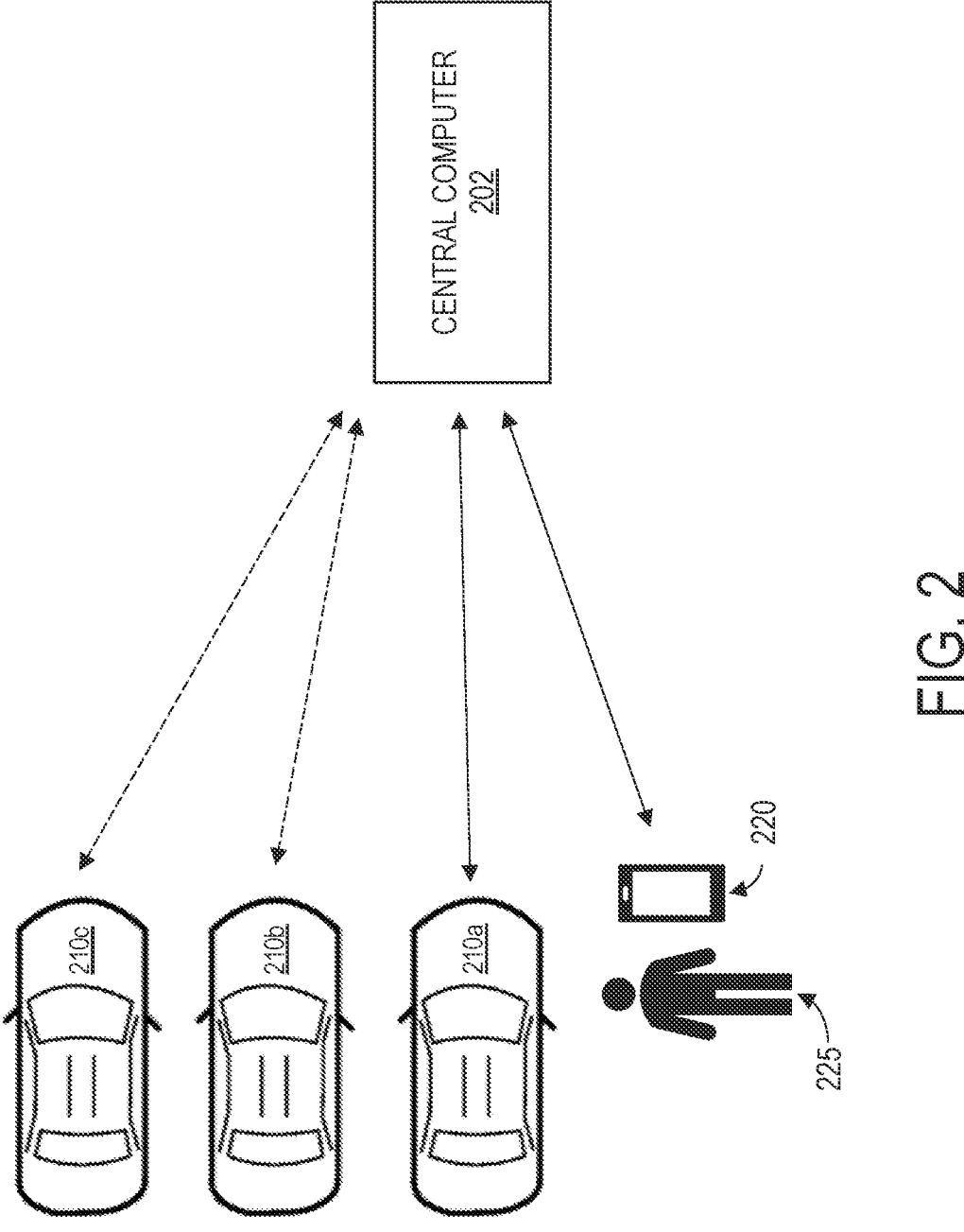
FIG. 2 shows a system for fleet-connected vehicle identification, according to some examples of the present disclosure.

FIG. 2 shows a system 200 for fleet-connected vehicle identification, according to some examples of the present disclosure. The system 200 includes first 210a, second 210b, and third 210c vehicles (collectively "vehicle 210") and a central computer 202. Each of the first 210a, second 210b, and third 210c vehicles is in communication with a central computer 202. The vehicles 210 transmit vehicle data to the central computer 202, and receive vehicle updates and other commands from the central computer 202. In some examples, when a vehicle drives to a vehicle facility, such as a charging facility, a maintenance facility, a service facility, and/or a cleaning facility, an operator at the facility can interact with the vehicle to provide the requested vehicle service.

FIG. 2 includes an operator 225 having a mobile device 220. In order for the operator 225 to gain access to a vehicle 210, a system for the operator 225 to communicate with the vehicle 210 is used. In some examples, each of the vehicles 210 use onboard equipment to approximate its location, and an onboard computer to communicate its location to the central computer 202. In general, at least for security purposes, autonomous vehicles 210 do not autonomously connect with, or provide information to, devices in the vehicle's proximity. Instead, as shown in FIG. 2, the operator 225 uses a mobile device 220 to communicate with the central computer 202 and request access to the first vehicle 210a. In some examples, the mobile device 220 is temporarily attached to the outside of a vehicle 210. In particular, the mobile device 220 can be attached to the first vehicle 210a when requesting information about the first vehicle 210a, such that the mobile device 220 provides vehicle information about the first vehicle 210a to any personnel or operators in the facility.

The mobile device 220 can include a fleet vehicle access application through which the operator 225 communicates with the central computer 202. Since the operator 225 does not have vehicle identification data for the first vehicle 210a, the operator 225 places the mobile device 220 in close proximity to the first vehicle 210a (and in some instances, the operator 225 temporarily attaches the mobile device 220 to the first vehicle 210a). The mobile device 220 is connected to a wireless communication network, such as a Wi-Fi, LTE, 5G, or other communication network. Using the fleet vehicle access application, the mobile device 220 location is transmitted to the central computer 202 along with a request for vehicle data and/or vehicle access. The central computer 202 receives the mobile device 220 location and identifies the vehicle 210 closest to the mobile device 220, for example using the vehicle's geoposition. In some examples, Near Field Communication (NFC) or other direct communication between the first vehicle 210a and the mobile device 220 can be used to identify the first vehicle 210a in closest proximity to the mobile device 220. As shown in FIG. 2, the first vehicle 210a is in closest proximity to the mobile device 220.

Once the central computer 202 has identified the closest vehicle 210a to the mobile device 220, the central computer 202 reviews the vehicle data request, obtains the vehicle data for the first vehicle 210a, and transmits the vehicle data to the mobile device 220. In some examples, the central computer 202 obtains new up-to-date information from the first vehicle 210a and transmits the current vehicle data to the mobile device 220. In some examples, the central computer 202 is unable to connect with the first vehicle 210a, and transmits the most recently received data from the first vehicle 210a to the mobile device 220.

According to various implementations, the vehicle data that can be communicated with the mobile device 220 (and thereby to operations personnel such as the operator 225) can include a vehicle identification, vehicle intended destination, a vehicle location, intended facility activities for the vehicle (e.g., maintenance, cleaning), active faults, a visual identification of fault codes, a battery state of charge for the vehicle, disk space on the vehicle onboard computer, current firmware versions of software for various vehicle components, firmware updates, sensor cleaning fluid reservoir level, stored detected vandalism events, tire pressure, tread depth, brake wear, 12 Volt battery capacity, coolant levels, and other specification information. Additionally, in some examples, the vehicle data can include two-way communication for the operator. In some examples, the vehicle data can include a checklist of steps taken if incomplete work has been performed on the vehicle. A vehicle cleaning schedule can also be communicated with the mobile device 220, including a most recent cleaning and any upcoming scheduled cleanings. The vehicle data can be displayed on the screen of the mobile device 220, and in some examples, the vehicle data can be updated as services are performed on the first vehicle 210a. For example, the battery state of charge can be updated as the vehicle charges. In another example, a checklist of requested services can be ticked off as services are performed. For instance, if the service checklist for first vehicle 210a includes inflate tires, vacuum interior cabin, clean vehicle exterior, and refill windshield washer fluid, as each of these tasks is performed, the item can be checked off on a checklist displayed on the mobile device 220. In some examples, an operator checks off the completed tasks. In other examples, vehicle sensors identify when a task has been completed (e.g., a vehicle sensor detects when the washer fluid has been refilled, vehicle sensors detects when tire pressure is returned to an optimal level, etc.), the updated vehicle data is transmitted to the central computer, the central computer transmits the updated vehicle data to the fleet vehicle access application on the mobile device, and the tasks are automatically checked off.

In some implementations, various capabilities can be provided to the operator 225 via the mobile device 220 with respect to the first vehicle 210a. For example, the operator 225 can be provided access to the vehicle, including the ability to open the cabin doors, interior panels, and the rear hatch. The interior panel encloses various vehicle features that only authorized personnel can access, such as a vehicle on/off switch and a port for connecting external controllers. In some examples, the operator 225 can be provided the ability to trigger vehicle visual and/or audio alerts, such as beeping the horn and flashing the lights. Additionally, the operator 225 can be provided the ability to switch on and/or off auxiliary lighting such as interior cabin lighting and exterior lighting (e.g., headlights, tail lights, brake lights, indicator lights, etc.).

In some examples, the vehicle location is determined by the central computer 202 using information transmitted from the facility infrastructure to the central computer 202. In particular, in some examples, the central computer 202 can use the last received vehicle data in combination with information transmitted from the facility infrastructure to determine vehicle location. The last received vehicle data may not be the current vehicle data, and the vehicle location may have changed. Thus, in some examples, the vehicle location information can be updated based on information transmitted from the facility infrastructure. Information the facility infrastructure can provide to the central computer 202 can include the specific charger the vehicle is currently plugged into, the specific ethernet port the vehicle is currently connected to, the vehicle link with a mmWave signal, the vehicle link with a free space optical signal, and/or the signal strength from a WiFi access point. In some examples, the vehicle location is determined using GPS data as well as inertial feedback data from, e.g., an inertial measurement unit (IMU). In various examples, there is a mapping of where routers are positioned within a facility, and signal strength of the signal from each router can be used to determine vehicle location. Similarly, signal strength of the signal from each router can be used to determine the mobile device location.

In some implementations, a vehicle transmits its location to a central computer before the vehicle shuts down or is otherwise out of commission. In some instances, a vehicle can be non-communicative. For example, if a vehicle is damaged or if a vehicle shuts down due to a low state of charge or other reason, a vehicle 210 may not communicate with the central computer 202. In some examples, a vehicle may have been involved in an accident, and the most recent vehicle data may be from before or during the accident. In some examples, a vehicle may have experienced a vandalism event, and the most recent vehicle data may be from before or during the vandalism event. In these and other examples, a vehicle transmits its location to the central computer before it becomes non-communicative. In some examples, the operator 225 can use the mobile device 220 fleet vehicle access application to scan a license plate of an inoperative vehicle and upload the image to the central computer 202. The central computer 202 can then transmit to the mobile device 220 the vehicle ID, the most recent status of the vehicle, any vehicle fault codes, etc. In some examples, an autonomous vehicle includes an RFID tag that can be scanned by the mobile device 220 and transmitted via the fleet vehicle access application to the central computer 202 to identify the vehicle. Once the vehicle is identified, and the mobile device 220 is attached to the vehicle, the mobile device 220 can act as a status beacon for the vehicle.

In some examples, when non-communicative a vehicle is plugged into a vehicle charger, vehicle identification information is transmitted to the charger. In some examples, the vehicle identification information transmitted to the charger can be transmitted to the central computer, which can transmit the vehicle identification information to the fleet vehicle access application. In some examples, the vehicle identification information transmitted to the charger can be transmitted from the charger to the fleet vehicle access application.

In some implementations, there is a small set of fleet vehicles that are non-communicative, and the central computer 202 has data about each fleet vehicle in the set. In various examples, the central computer 202 can evaluate the data about the set of non-communicative fleet vehicles and identify a subset of fleet vehicles that any particular non-communicative fleet vehicle can belong to. In some examples, a non-communicative fleet vehicle can be identified based on various unique features, such as a known scratch at a specific location, a known small dent on the bumper, etc.

Figure 3:
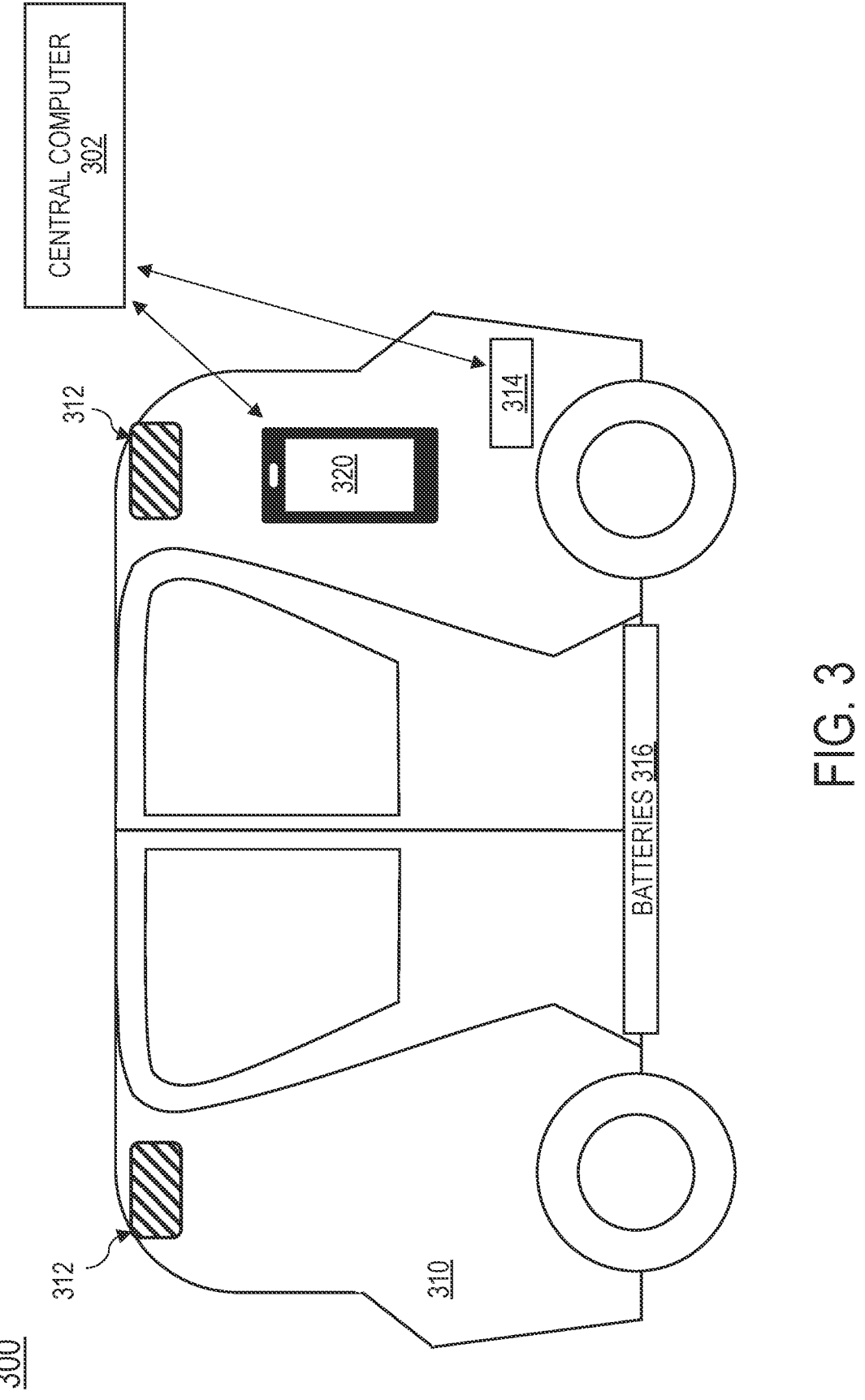
FIG. 3 shows an example of a fleet vehicle and a mobile device, according to some examples of the present disclosure.

FIG. 3 shows an example of a fleet vehicle 310 including a sensor suite 312, an onboard computer 314, and batteries 316, according to various examples of the present disclosure. The onboard computer 314 communicates with the central computer 302, and, in some examples, the onboard computer 314 transmits vehicle data to the central computer 302. The fleet vehicle 310 has a mobile device 320 temporarily attached to the exterior of the vehicle. In various examples, the mobile device 320 can be held in place by any type of temporary attachment mechanism, such as magnetically or with suction cups. The mobile device 320 connects with the central computer 302, receives vehicle data, and displays the vehicle data for the fleet vehicle 310, as described above with respect to FIG. 2. Thus, any operator or other facility personnel passing by the vehicle 310 can view the screen of the mobile device 320 to obtain vehicle data for the vehicle 310.

Example Method for Fleet-Connected Vehicle Identification

FIG. 4 is a flowchart showing a method 400 for fleet-connected vehicle identification, according to various examples of the present disclosure. At step 402, a mobile device is connected with a central computer via a fleet vehicle access application. In particular, a fleet vehicle access application running on the mobile device provides an interface for connecting the mobile device with the central computer. Additionally, the fleet vehicle access application provides an interface for requesting specific types of vehicle data, such as fault data or scheduled maintenance data.

Optionally, at step 404, the mobile device is attached to an exterior surface of a vehicle. In particular, an operator attaches the mobile device to the vehicle for which the operator is requesting vehicle data via the mobile device. In various examples, the operator attaches the mobile device to an exterior surface of the vehicle, and to a location where it will be highly visible to other operators and/or personnel in the facility where the vehicle is located. In various examples, the mobile device is attached magnetically, with suction cups, and/or with an alternative attachment mechanism. In some examples, a mobile device holder is attached to the vehicle.

At step 406, the mobile device location is determined. In some examples, the central computer determines the mobile device location. In various examples, the mobile device can transmit its location data to the central computer.

At step 408, a vehicle data request is received via the fleet vehicle access application. In some examples, the central computer receives the vehicle data request from the fleet vehicle access application. The vehicle data request can include a request for any type of data about the vehicle, including the vehicle identification, vehicle location, vehicle intended destination, intended facility activities for the vehicle (e.g., maintenance, cleaning), active faults, a visual identification of fault codes, battery state of charge for the vehicle, disk space on the vehicle onboard computer, current firmware versions of software for various vehicle components, firmware updates, sensor cleaning fluid reservoir level, stored detected vandalism events, tire pressure, tread depth, brake wear, 12 Volt battery capacity, coolant levels, and other specification information. In some examples, the vehicle data can include a checklist of steps taken if incomplete work has been performed on the vehicle. A vehicle cleaning schedule can also be communicated with the mobile device, including a most recent cleaning and any upcoming scheduled cleanings.

In some examples, a vehicle data request can include a request that the vehicle drive to a different selected location. In various examples, the central computer can evaluate the request and determine whether to have dispatch command the vehicle to move to the selected location.

At step 410, the vehicle in close proximity to the mobile device is identified. In particular, the central computer determines the location of one or more vehicles in proximity to the mobile device, and identifies the vehicle in closest proximity to the mobile device (i.e., the vehicle to which the mobile device is attached). In some examples, geoposition data is used to determine the vehicle closest to the mobile device. In some examples, a last received vehicle location is used to determine the vehicle closest to the mobile device. In some examples, as described with respect to FIG. 2, when the vehicle is in a facility, information from facility infrastructure can be used to determine vehicle location and identify the vehicle closest to the mobile device. In some examples, as described with respect to FIG. 2, when the vehicle is in a facility, last received vehicle data can be used in combination with information from facility infrastructure to determine respective vehicle locations and identify the vehicle closest to the mobile device.

In some implementations, the vehicle in closest proximity to the mobile device (e.g., the vehicle to which the mobile device is attached) is non-communicative. The mobile device and the fleet vehicle access application can be used to scan the vehicle license plate. In some examples, the fleet vehicle access application can transmit the scan to a central computer, which identifies the vehicle. In some examples, the fleet vehicle access application determines the license plate information from the scan and transmits the license plate number and other license plate information to the central computer, which identifies the vehicle. In various examples, for a non-communicative vehicle, the central computer updates the vehicle location to the mobile device location. For instance, the vehicle location can be updated to the geolocation of the mobile device.

At step 412, vehicle data is transmitted to the fleet vehicle access application. In various examples, vehicle data requested in the vehicle data request at step 408 is transmitted to the fleet vehicle application. In some examples, the central computer transmits the vehicle data to the fleet vehicle access application. In some implementations, when the central computer receives a vehicle data request, the central computer requests updated vehicle data from the vehicle, receives updated vehicle data from the vehicle, and transmits the updated vehicle data to the fleet vehicle access application. In some examples, in response to a vehicle data request, the central computer transmits the most recently received vehicle data to the fleet vehicle application. When a vehicle is non-communicative, the most recently received vehicle data can be the last vehicle data transmission received before the vehicle became non-communicative. In some examples, a vehicle can become non-communicative due to an accident or a vandalism event.

At step 414, the vehicle data is displayed on the mobile device screen. In some examples, the vehicle data is displayed via the fleet vehicle access application. In some examples, the vehicle data includes more data than can be easily displayed or easily legible on the mobile device screen, and multiple screens of data are available on the mobile device. The main screen can include the vehicle identification and the intended destination or location of the vehicle. The main screen may also include a list of services to be performed on the vehicle. In some examples, vehicle faults and/or other information is displayed on subsequent screens when an operator swipes through the vehicle data.

Example of an Autonomous Vehicle Fleet

Figure 5:
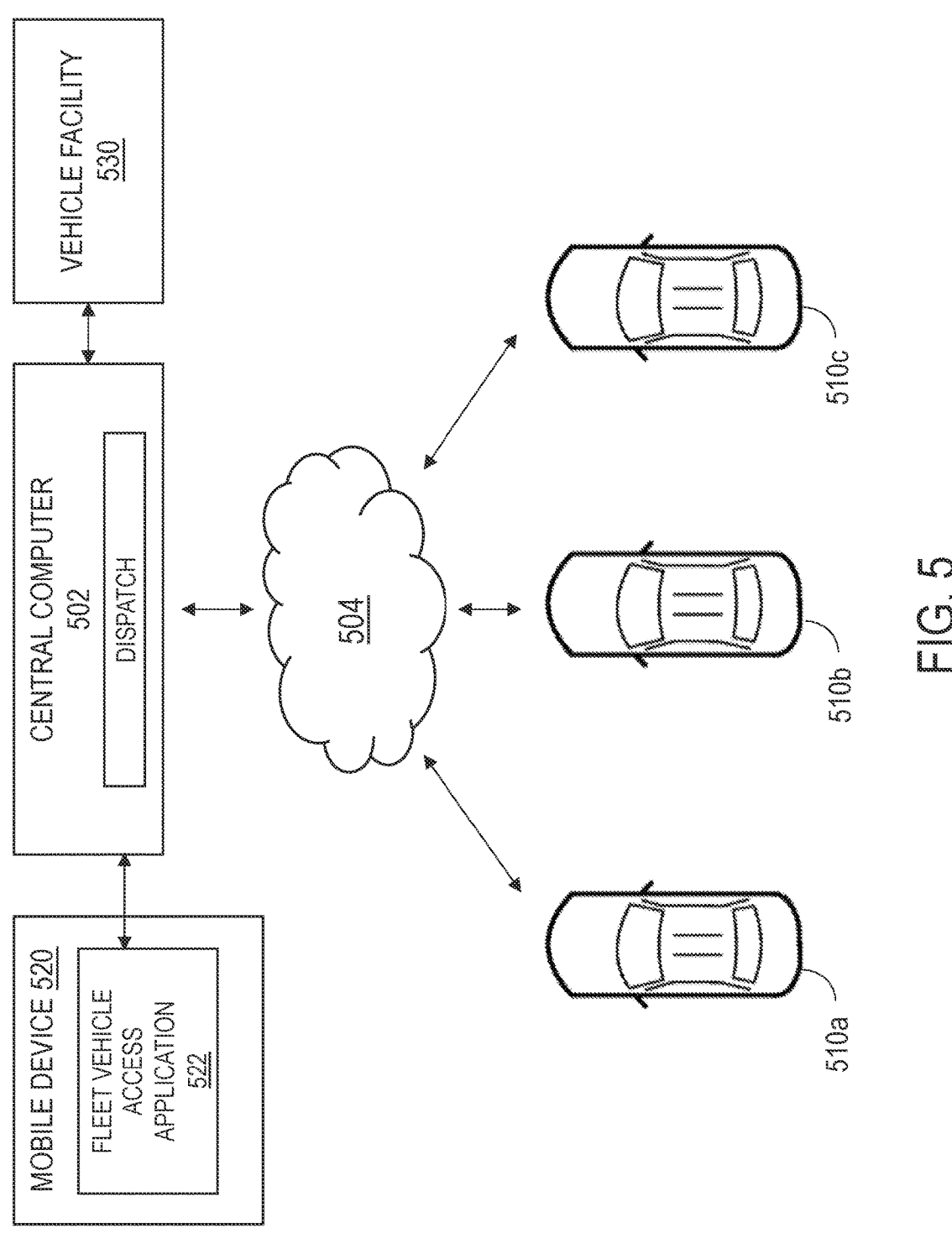
FIG. 5 is a diagram illustrating a fleet of autonomous vehicles in communication with a central computer, according to some examples of the present disclosure.

FIG. 5 is a diagram 500 illustrating a fleet of autonomous vehicles 510a, 510b, 510c in communication with a central computer 502, according to some embodiments of the disclosure. The vehicles 510a-510c communicate wirelessly with a cloud 504 and a central computer 502. The central computer 502 includes a routing coordinator, a dispatch service, and a database of information from the vehicles 510a-510c in the fleet. In some examples, the database of information can include a state of charge of each vehicle as well as other vehicle conditions and information. Autonomous vehicle fleet routing refers to the routing of multiple vehicles in a fleet.

The central computer 502 also communicates with various fleet facilities 530, where one or more for the fleet vehicles 510a-510c can drive for charging, maintenance, cleaning, and other services. A fleet facility 530 can provide information to the central computer 502 about vehicles at the fleet facility 530, such as a parking spot and/or location of each vehicle at the fleet facility 530. In some examples, a fleet facility includes multiple routers or other wireless signal access points that can connect with vehicles in the fleet facility 530. In some examples, vehicles 510a-510c can communicate battery state of charge, maintenance needs, various fault codes, and other vehicle data with the central computer 502. When a vehicle 510a-510c needs service, the dispatch system can route the vehicle 510a-510c to a facility 530. Additionally, the dispatch system can provide the facility 530 with the time at which the vehicle 510a-510c will arrive at the facility 530. In some examples, a vehicle 510a-510c can be non-communicative and is towed to a facility 530 for service.

As shown in the diagram 500, the central computer 502 can also communicate with fleet vehicle access applications 522 on various mobile devices 520. In particular, a fleet vehicle access application 522 can transmit a request to the central computer 502. The request can include a vehicle identification request for a vehicle in close proximity to the mobile device 520, a vehicle data request for a vehicle in close proximity to the mobile device 520, and/or a vehicle access request for a vehicle in close proximity to the mobile device 520. In some examples, as described in greater detail above, the mobile device 520 can be temporarily attached to a vehicle 510a-510c.

Each vehicle 510a-510c in the fleet of vehicles communicates with a routing coordinator. Thus, information gathered by various autonomous vehicles 510a-510c in the fleet can be saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more traveling preferences and/or routing goals. In some examples, the routing coordinator uses collected position data corresponding to emergency events to generate a best route for an autonomous vehicle to avoid a potential emergency situation and associated unknowns. In some examples, the routing coordinator generates a route for a vehicle to the facility 530. In some examples, a vehicle 510a-510c has one or more scheduled stops before embarking on its route to the facility 530.

Example Autonomous Vehicle (AV) Management System

Figure 6:
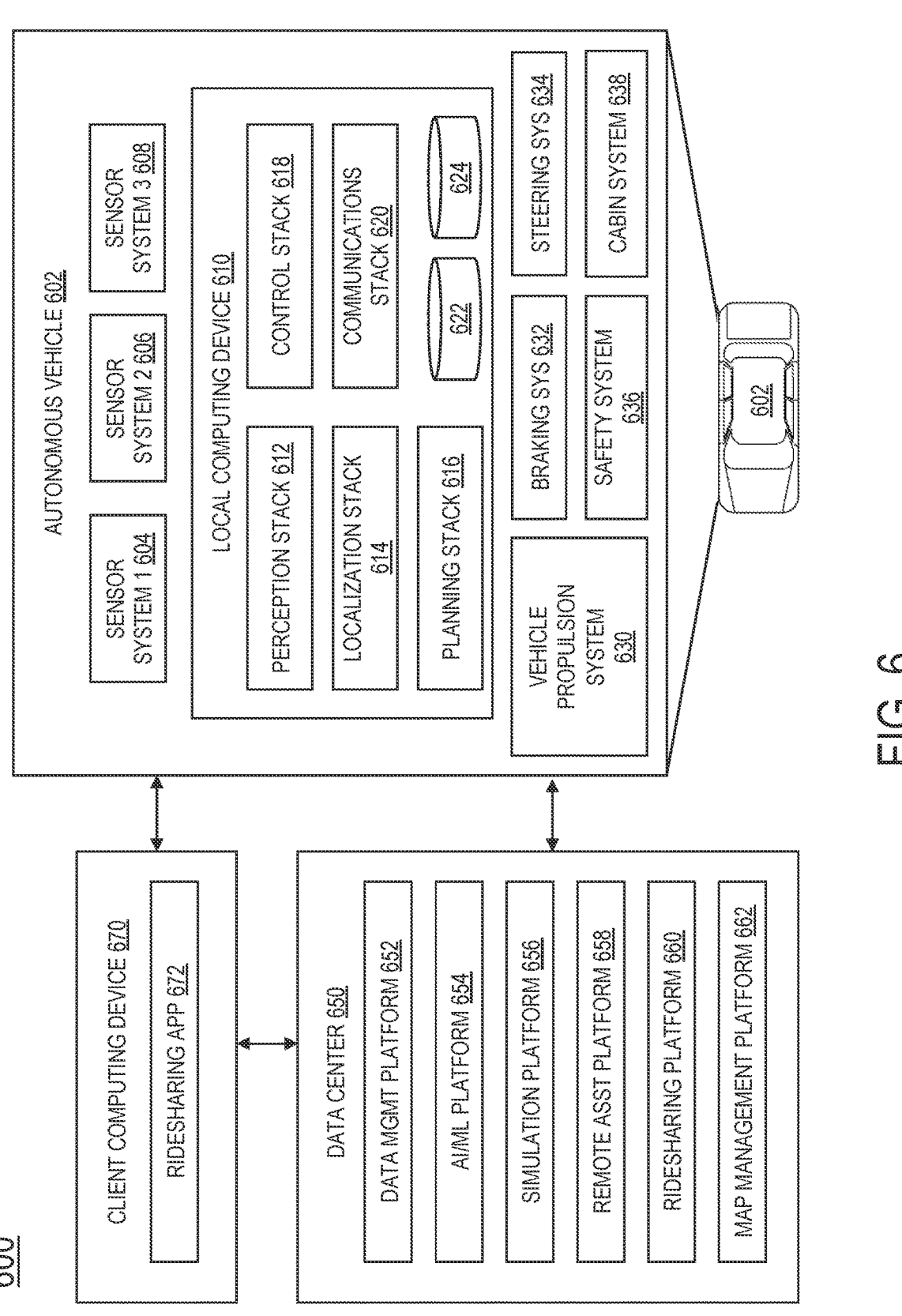
FIG. 6 illustrates an example system environment that can be used to facilitate autonomous vehicle (AV) dispatch and operations, according to some aspects of the disclosed technology.

Turning now to FIG. 6, this figure illustrates an example of an AV management system 600. One of ordinary skill in the art will understand that, for the AV management system 600 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 600 includes an AV 602, a data center 650, and a client computing device 670. The AV 602, the data center 650, and the client computing device 670 can communicate with one another over one or more networks (not shown), such as a public network (e.g., the Internet, an Infrastructure as a Service (IaaS) network, a Platform as a Service (PaaS) network, a Software as a Service (Saas) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 602 can navigate about roadways without a human driver based on sensor signals generated by multiple sensor systems 604, 606, and 608. The sensor systems 604-608 can include different types of sensors and can be arranged about the AV 602. For instance, the sensor systems 604-608 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 604 can be a camera system, the sensor system 606 can be a LIDAR system, and the sensor system 608 can be a RADAR system. Other embodiments may include any other number and type of sensors. Additionally, in various implementations, as discussed herein, an active tunable filter 680 can be used for real-time diagnostics. An active tunable filter 680 can also be added to components of the AV 602 to filter out harmonics and/or noise from transmitted signals.

AV 602 can also include several mechanical systems that can be used to maneuver or operate AV 602. For instance, the mechanical systems can include vehicle propulsion system 630, braking system 632, steering system 634, safety system 636, and cabin system 638, among other systems. Vehicle propulsion system 630 can include an electric motor, an internal combustion engine, or both. The braking system 632 can include an engine brake, a wheel braking system (e.g., a disc braking system that utilizes brake pads), hydraulics, actuators, and/or any other suitable componentry configured to assist in decelerating AV 602. The steering system 634 can include suitable componentry configured to control the direction of movement of the AV 602 during navigation. Safety system 636 can include lights and signal indicators, a parking brake, airbags, and so forth. The cabin system 638 can include cabin temperature control systems, in-cabin entertainment systems, and so forth. In some embodiments, the AV 602 may not include human driver actuators (e.g., steering wheel, handbrake, foot brake pedal, foot accelerator pedal, turn signal lever, window wipers, etc.) for controlling the AV 602. Instead, the cabin system 638 can include one or more client interfaces (e.g., Graphical User Interfaces (GUIs), Voice User Interfaces (VUIs), etc.) for controlling certain aspects of the mechanical systems 630-638.

AV 602 can additionally include a local computing device 610 that is in communication with the sensor systems 604-608, the mechanical systems 630-638, the data center 650, and the client computing device 670, among other systems. The local computing device 610 can include one or more processors and memory, including instructions that can be executed by the one or more processors. The instructions can make up one or more software stacks or components responsible for controlling the AV 602; communicating with the data center 650, the client computing device 670, and other systems; receiving inputs from riders, passengers, and other entities within the AV's environment; logging metrics collected by the sensor systems 604-608; and so forth. In this example, the local computing device 610 includes a perception stack 612, a mapping and localization stack 614, a planning stack 616, a control stack 618, a communications stack 620, an High Definition (HD) geospatial database 622, and an AV operational database 624, among other stacks and systems.

Perception stack 612 can enable the AV 602 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 604-608, the mapping and localization stack 614, the HD geospatial database 622, other components of the AV, and other data sources (e.g., the data center 650, the client computing device 670, third-party data sources, etc.). The perception stack 612 can detect and classify objects and determine their current and predicted locations, speeds, directions, and the like. In addition, the perception stack 612 can determine the free space around the AV 602 (e.g., to maintain a safe distance from other objects, change lanes, park the AV, etc.). The perception stack 612 can also identify environmental uncertainties, such as where to look for moving objects, flag areas that may be obscured or blocked from view, and so forth.

Mapping and localization stack 614 can determine the AV's position and orientation (pose) using different methods from multiple systems (e.g., GPS, IMUs, cameras, LIDAR, RADAR, ultrasonic sensors, the HD geospatial database 622, etc.). For example, in some embodiments, the AV 602 can compare sensor data captured in real-time by the sensor systems 604-608 to data in the HD geospatial database 622 to determine its precise (e.g., accurate to the order of a few centimeters or less) position and orientation. The AV 602 can focus its search based on sensor data from one or more first sensor systems (e.g., GPS) by matching sensor data from one or more second sensor systems (e.g., LIDAR). If the mapping and localization information from one system is unavailable, the AV 602 can use mapping and localization information from a redundant system and/or from remote data sources.

The planning stack 616 can determine how to maneuver or operate the AV 602 safely and efficiently in its environment. For example, the planning stack 616 can receive the location, speed, and direction of the AV 602, geospatial data, data regarding objects sharing the road with the AV 602 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 602 from one point to another. The planning stack 616 can determine multiple sets of one or more mechanical operations that the AV 602 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 616 can select from multiple backup plans to carry out. For example, while preparing to change lanes to turn right at an intersection, another vehicle may aggressively cut into the destination lane, making the lane change unsafe. The planning stack 616 could have already determined an alternative plan for such an event, and upon its occurrence, help to direct the AV 602 to go around the block instead of blocking a current lane while waiting for an opening to change lanes.

The control stack 618 can manage the operation of the vehicle propulsion system 630, the braking system 632, the steering system 634, the safety system 636, and the cabin system 638. The control stack 618 can receive sensor signals from the sensor systems 604-608 as well as communicate with other stacks or components of the local computing device 610 or a remote system (e.g., the data center 650) to effectuate operation of the AV 602. For example, the control stack 618 can implement the final path or actions from the multiple paths or actions provided by the planning stack 616. This can involve turning the routes and decisions from the planning stack 616 into commands for the actuators that control the AV's steering, throttle, brake, and drive unit.

The communication stack 620 can transmit and receive signals between the various stacks and other components of the AV 602 and between the AV 602, the data center 650, the client computing device 670, and other remote systems. The communication stack 620 can enable the local computing device 610 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 620 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 622 can store HD maps and related data of the streets upon which the AV 602 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 624 can store raw AV data generated by the sensor systems 604-608 and other components of the AV 602 and/or data received by the AV 602 from remote systems (e.g., the data center 650, the client computing device 670, etc.). In some embodiments, the raw AV data can include HD LIDAR point cloud data, image or video data, RADAR data, GPS data, and other sensor data that the data center 650 can use for creating or updating AV geospatial data as discussed further elsewhere in the present disclosure.

The data center 650 can be a private cloud (e.g., an enterprise network, a co-location provider network, etc.), a public cloud (e.g., an Infrastructure as a Service (IaaS) network, a Platform as a Service (PaaS) network, a Software as a Service (Saas) network, or other Cloud Service Provider (CSP) network), a hybrid cloud, a multi-cloud, and so forth. The data center 650 can include one or more computing devices remote to the local computing device 610 for managing a fleet of AVs and AV-related services. For example, in addition to managing the AV 602, the data center 650 may also support a ridesharing service, a delivery service, a remote/roadside assistance service, street services (e.g., street mapping, street patrol, street cleaning, street metering, parking reservation, etc.), and the like. The data center can include the fleet management system 120 of FIG. 1, the central computer 202 of FIG. 2, and/or the central computer 502 of FIG. 5.

The data center 650 can send and receive various signals to and from the AV 602 and the client computing device 670. These signals can include sensor data captured by the sensor systems 604-608, roadside assistance requests, software updates, ridesharing pick-up and drop-off instructions, and so forth. In this example, the data center 650 includes one or more of a data management platform 652, an Artificial Intelligence/Machine Learning (AI/ML) platform 654, a simulation platform 656, a remote assistance platform 658, a ridesharing platform 660, and a map management platform 662, among other systems.

Data management platform 652 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 650 can access data stored by the data management platform 652 to provide their respective services.

The AI/ML platform 654 can provide the infrastructure for training and evaluating machine learning algorithms for operating the AV 602, the simulation platform 656, the remote assistance platform 658, the ridesharing platform 660, the map management platform 662, and other platforms and systems. Using the AI/ML platform 654, data scientists can prepare data sets from the data management platform 652; select, design, and train machine learning models; evaluate, refine, and deploy the models; maintain, monitor, and retrain the models; and so on.

The simulation platform 656 can enable testing and validation of the algorithms, machine learning models, neural networks, and other development efforts for the AV 602, the remote assistance platform 658, the ridesharing platform 660, the map management platform 662, and other platforms and systems. The simulation platform 656 can replicate a variety of driving environments and/or reproduce real-world scenarios from data captured by the AV 602, including rendering geospatial information and road infrastructure (e.g., streets, lanes, crosswalks, traffic lights, stop signs, etc.) obtained from the map management platform 662; modeling the behavior of other vehicles, bicycles, pedestrians, and other dynamic elements; simulating inclement weather conditions, different traffic scenarios; and so on.

The remote assistance platform 658 can generate and transmit instructions regarding the operation of the AV 602. For example, in response to an output of the AI/ML platform 654 or other system of the data center 650, the remote assistance platform 658 can prepare instructions for one or more stacks or other components of the AV 602.

The ridesharing platform 660 can interact with a customer of a ridesharing service via a ridesharing application 672 executing on the client computing device 670. The client computing device 670 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 672. The client computing device 670 can be a customer's mobile computing device or a computing device integrated with the AV 602 (e.g., the local computing device 610). The ridesharing platform 660 can receive requests to be picked up or dropped off from the ridesharing application 672 and dispatch the AV 602 for the trip.

Map management platform 662 can provide a set of tools for the manipulation and management of geographic and spatial (geospatial) and related attribute data. The data management platform 652 can receive LIDAR point cloud data, image data (e.g., still image, video, etc.), RADAR data, GPS data, and other sensor data (e.g., raw data) from one or more AVs 602, Unmanned Aerial Vehicles (UAVs), satellites, third-party mapping services, and other sources of geospatially referenced data. The raw data can be processed, and map management platform 662 can render base representations (e.g., tiles (2D), bounding volumes (3D), etc.) of the AV geospatial data to enable users to view, query, label, edit, and otherwise interact with the data. Map management platform 662 can manage workflows and tasks for operating on the AV geospatial data. Map management platform 662 can control access to the AV geospatial data, including granting or limiting access to the AV geospatial data based on user-based, role-based, group-based, task-based, and other attribute-based access control mechanisms. Map management platform 662 can provide version control for the AV geospatial data, such as to track specific changes that (human or machine) map editors have made to the data and to revert changes when necessary. Map management platform 662 can administer release management of the AV geospatial data, including distributing suitable iterations of the data to different users, computing devices, AVs, and other consumers of HD maps. Map management platform 662 can provide analytics regarding the AV geospatial data and related data, such as to generate insights relating to the throughput and quality of mapping tasks. In some examples, AV geospatial data can be used for AV location determination in a facility.

In some embodiments, the map viewing services of map management platform 662 can be modularized and deployed as part of one or more of the platforms and systems of the data center 650. For example, the AI/ML platform 654 may incorporate the map viewing services for visualizing the effectiveness of various object detection or object classification models, the simulation platform 656 may incorporate the map viewing services for recreating and visualizing certain driving scenarios, the remote assistance platform 658 may incorporate the map viewing services for replaying traffic incidents to facilitate and coordinate aid, the ridesharing platform 660 may incorporate the map viewing services into the client application 672 to enable passengers to view the AV 602 in transit en route to a pick-up or drop-off location, and so on.

Example Processing System

Figure 7:
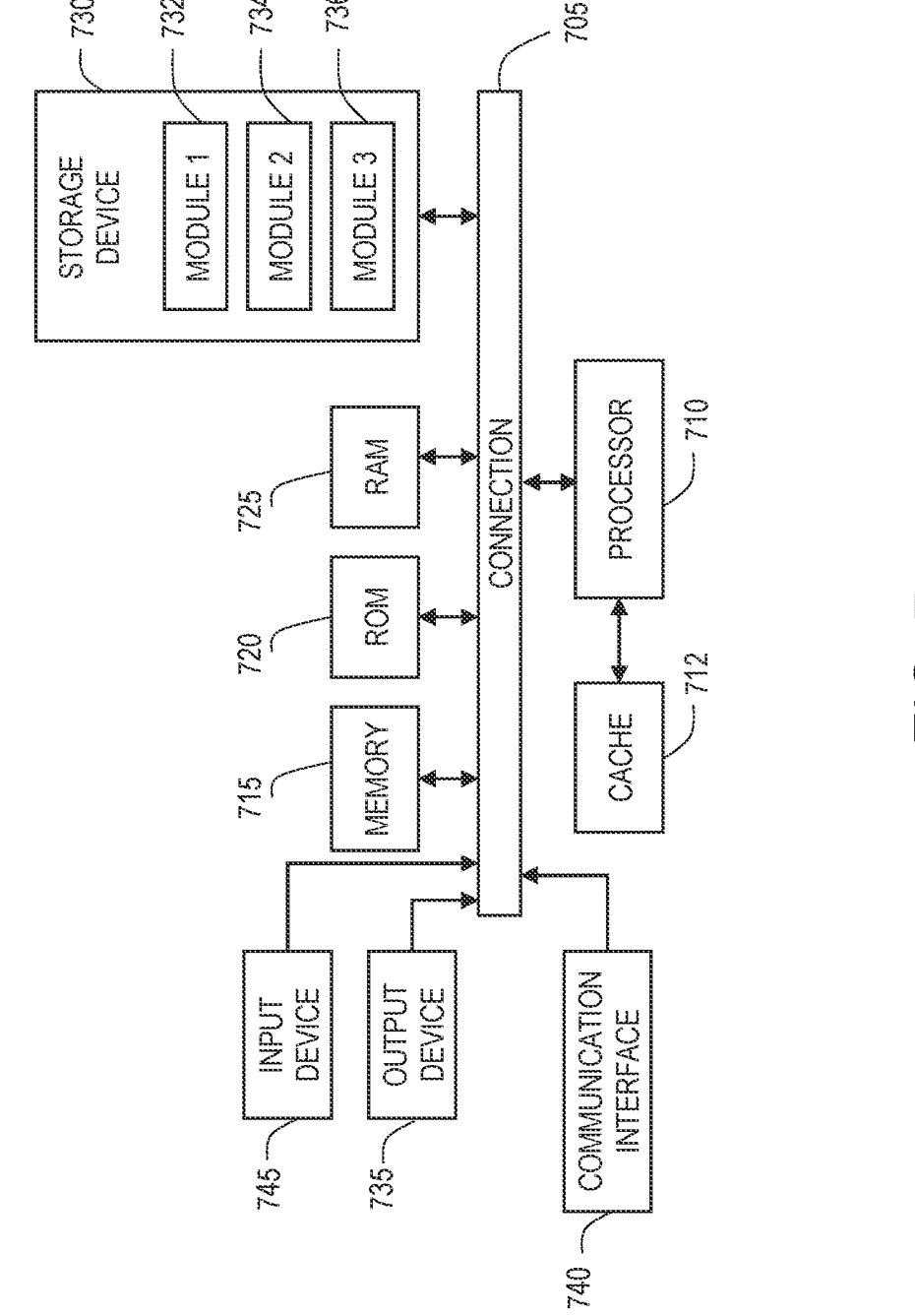
FIG. 7 illustrates an example processor-based system with which some aspects of the subject technology can be implemented.

FIG. 7 illustrates an example processor-based system with which some aspects of the subject technology can be implemented. For example, processor-based system 700 can be any computing device making up, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection. In various examples, an active tunable filter as discussed herein can be added to any of the components to filter harmonics and/or noise from transmitted signals.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (Central Processing Unit (CPU) or processor) 710 and connection 705 that couples various system components including system memory 715, such as Read-Only Memory (ROM) 720 and Random-Access Memory (RAM) 725 to processor 710. Computing system 700 can include a cache of high-speed memory 712 connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Static RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 730 can include software services, servers, services, etc., that when the code that defines such software is executed by the processor 710, it causes the system 700 to perform a function. In some embodiments, a hardware service that performs a particular function can include the software component stored in a computer-readable medium in connection with the necessary hardware components, such as processor 710, connection 705, output device 735, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Example 1 provides a system for fleet-connected vehicle identification, comprising: a plurality of fleet vehicles, wherein each fleet vehicle of the plurality of fleet vehicles is configured to transmit vehicle data to a central computer; a mobile device configured to: determine a device location for the mobile device, transmit a connection request, via a fleet vehicle access application, to connect with a selected fleet vehicle of the plurality of fleet vehicles, and transmit a vehicle data request for the selected fleet vehicle via the fleet vehicle access application; and the central computer, configured to: receive the vehicle data from each fleet vehicle; receive the connection request from the fleet vehicle access application, including the device location, receive the vehicle data request from the fleet vehicle access application, identify, from the plurality of fleet vehicles, at least one fleet vehicle in close proximity to the device location, request, from the at least one fleet vehicle, updated vehicle data; determine that the at least one fleet vehicle is the selected fleet vehicle, and transmit vehicle data for the selected fleet vehicle from the central computer to the fleet vehicle access application.

Example 2 provides a system, method, application, and/or vehicle according to one or more of the preceding and/or following examples system, wherein the central computer is further configured to identify a subset of fleet vehicles in proximity to the device location and determine that the at least one fleet vehicle is in closest proximity to the device location.

Example 3 provides a system, method, application, and/or vehicle according to one or more of the preceding and/or following examples system, wherein the mobile device includes an attachment mechanism configured for temporarily attaching the mobile device to an exterior surface of the selected fleet vehicle, and wherein the mobile device is attached to the selected fleet vehicle via the attachment mechanism.

Example 4 provides a system, method, application, and/or vehicle according to one or more of the preceding and/or following examples system, wherein each fleet vehicle of the plurality of fleet vehicles includes an attachment mechanism configured for temporarily attaching the mobile device to an exterior surface of the selected fleet vehicle, and wherein the mobile device is attached to the selected fleet vehicle via the attachment mechanism.

Example 5 provides a system, method, application, and/or vehicle according to one or more of the preceding and/or following examples system, receive the vehicle data at the fleet vehicle access application, and display the vehicle data on a mobile device screen.

Example 6 provides a system, method, application, and/or vehicle according to one or more of the preceding and/or following examples system, wherein the mobile device is further configured to transmit a vehicle access request for operator access to an interior cabin of the selected fleet vehicle and for operator access to a secured interior compartment of the selected fleet vehicle.

Example 7 provides a system, method, application, and/or vehicle according to one or more of the preceding and/or following examples system, wherein the secured interior compartment encloses a fleet vehicle on/off switch and an external controller connection port.

Example 8 provides a system, method, application, and/or vehicle according to one or more of the preceding and/or following examples system, wherein the at least one fleet vehicle is non-communicative and non-responsive to an updated vehicle data request from the central computer.

Example 9 provides a system, method, application, and/or vehicle according to one or more of the preceding and/or following examples system, wherein the mobile device is further configured to: scan a license plate of the selected fleet vehicle and generate a license plate number, and transmit the license plate number to the central computer.

Example 10 provides a system, method, application, and/or vehicle according to one or more of the preceding and/or following examples system, wherein transmitting the vehicle data from the central computer includes transmitting last received vehicle data for the selected vehicle.

Example 11 provides a method for fleet-connected vehicle identification, comprising: receiving a mobile device connection request at a central computer via a fleet vehicle access application on a mobile device; determining a device location of the mobile device, wherein determining the device location includes utilizing signal strength of a plurality of wireless signals at the mobile device; receiving a vehicle data request from the mobile device at the central computer via the fleet vehicle access application; identifying a plurality of fleet vehicles in proximity to the device location; determining a first fleet vehicle of the plurality of fleet vehicles is in closest proximity to the device location, wherein determining that the first fleet vehicle is in closest proximity to the device location includes utilizing signal strength of the plurality of wireless signals at the first fleet vehicle; and transmitting vehicle data for the first fleet vehicle from the central computer to the fleet vehicle access application.

Example 12 provides a system, method, application, and/or vehicle according to one or more of the preceding and/or following examples system, further comprising receiving from the mobile device a vehicle access request for operator access to an interior cabin of the first fleet vehicle and for operator access to a secured interior compartment of the first fleet vehicle.

Example 13 provides a system, method, application, and/or vehicle according to one or more of the preceding and/or following examples system, further comprising providing operator access to the interior cabin and the secured interior compartment, wherein providing access to the secured interior compartment includes providing access to a vehicle on/off switch for the first fleet vehicle and an external controller connection port for the first fleet vehicle.

Example 14 provides a system, method, application, and/or vehicle according to one or more of the preceding and/or following examples system, further comprising: requesting updated vehicle data from the first fleet vehicle; receiving no response from the first fleet vehicle and determining that the first fleet vehicle is non-communicative; and transmitting a request for a license plate number of the first fleet vehicle to the fleet vehicle access application.

Example 15 provides a system, method, application, and/or vehicle according to one or more of the preceding and/or following examples system, further comprising receiving a scan of a first fleet vehicle license plate from the fleet vehicle access application, and determining the license plate number.

Example 16 provides a system, method, application, and/or vehicle according to one or more of the preceding and/or following examples system, wherein transmitting the vehicle data from the central computer includes transmitting last received vehicle data for the first fleet vehicle.

Example 17 provides a method for fleet-connected vehicle identification, comprising: receiving a mobile device connection request at a fleet vehicle access application; determining a device location of the mobile device, wherein determining the device location includes utilizing signal strength of a plurality of wireless signals at the mobile device; receiving a vehicle data request at the fleet vehicle access application for a selected vehicle in close proximity to the device location; transmitting the vehicle data request to a central computer for identification of the selected vehicle; and receiving vehicle data for the selected vehicle at the fleet vehicle access application.

Example 18 provides a system, method, application, and/or vehicle according to one or more of the preceding and/or following examples system, further comprising receiving a request for a license plate number of the first fleet vehicle to the fleet vehicle access application.

Example 19 provides a system, method, application, and/or vehicle according to one or more of the preceding and/or following examples system, further comprising scanning a first fleet vehicle license plate using a mobile device camera, determining the license plate number, and transmitting the license plate number via the fleet vehicle access application to the central computer.

Example 20 provides a system, method, application, and/or vehicle according to one or more of the preceding and/or following examples system, wherein receiving the vehicle data for the selected vehicle includes receiving last received vehicle data for the selected fleet vehicle.

Example 21 provides a system, method, application, and/or vehicle according to one or more of the preceding and/or following examples system, further comprising transmitting, from the fleet vehicle access application, an access request for operator access to an interior cabin of the selected vehicle and for operator access to a secured interior compartment of the selected vehicle, wherein access to the secured interior compartment includes access to a vehicle on/off switch for the selected vehicle and access to an external controller connection port for the selected vehicle.

Example 22 provides a system, method, application, and/or vehicle according to one or more of the preceding and/or following examples system, further comprising receiving a relocation request for the first fleet vehicle to drive to a selected location in the facility, evaluating the relocation request, and transmitting a command to the first fleet vehicle to drive to the selected location.

Example 23 provides one or more non-transitory computer-readable media storing instructions executable to perform operations, the operations comprising: receiving a mobile device connection request at a central computer via a fleet vehicle access application on a mobile device; determining a device location of the mobile device, wherein determining the device location includes utilizing signal strength of a plurality of wireless signals at the mobile device; receiving a vehicle data request from the mobile device at the central computer via the fleet vehicle access application; identifying a plurality of fleet vehicles in proximity to the device location; determining a first fleet vehicle of the plurality of fleet vehicles is in closest proximity to the device location, wherein determining that the first fleet vehicle is in closest proximity to the device location includes utilizing signal strength of the plurality of wireless signals at the first fleet vehicle; and transmitting vehicle data for the first fleet vehicle from the central computer to the fleet vehicle access application.

Example 24 provides one or more non-transitory computer-readable media storing instructions executable to perform operations, the operations comprising: receiving a mobile device connection request at a fleet vehicle access application; determining a device location of the mobile device, wherein determining the device location includes utilizing signal strength of a plurality of wireless signals at the mobile device; receiving a vehicle data request at the fleet vehicle access application for a selected vehicle in close proximity to the device location; transmitting the vehicle data request to a central computer for identification of the selected vehicle; and receiving vehicle data for the selected vehicle at the fleet vehicle access application.

Example 25 provides a system, method, application, and/or vehicle according to one or more of the preceding and/or following examples system, wherein the mobile device is further configured to: scan a license plate of the selected fleet vehicle, and transmit the scan to the central computer.

Example 26 provides a system, method, application, and/or vehicle according to one or more of the preceding and/or following examples system, wherein the mobile device is further configured to transmit the device location to the central computer.

Example 27 provides a system, method, application, and/or vehicle according to one or more of the preceding and/or following examples system, wherein the central computer is further configured to update a selected fleet vehicle location to the device location, and wherein the vehicle data includes last received vehicle data for the selected vehicle.

Example 28 provides a system, method, application, and/or vehicle according to one or more of the preceding and/or following examples system, wherein the vehicle data from each fleet vehicle includes a last received vehicle location.

Example 29 provides a system, method, application, and/or vehicle according to one or more of the preceding and/or following examples system, wherein a vehicle is non-communicative and wherein a current vehicle location is different from the last received vehicle location.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A system for fleet-connected vehicle identification, comprising:
    a plurality of fleet vehicles, wherein each fleet vehicle of the plurality of fleet vehicles is configured to transmit vehicle data to a central computer;
    a mobile device configured to:
        determine a device location for the mobile device based on signal strength of a plurality of wireless signals at the mobile device,
        transmit a connection request, via a fleet vehicle access application, to connect with a selected fleet vehicle of the plurality of fleet vehicles, and
        transmit a vehicle data request for the selected fleet vehicle via the fleet vehicle access application; and
    the central computer, configured to:
        receive the vehicle data from each fleet vehicle,
        receive the connection request from the fleet vehicle access application, including the device location,
        receive the vehicle data request from the fleet vehicle access application,
        identify, from the plurality of fleet vehicles, that the selected fleet vehicle of the plurality of fleet vehicles is in closest proximity to the device location, wherein identifying that the selected fleet vehicle is in closest proximity to the device location includes utilizing signal strength of the plurality of wireless signals at the selected fleet vehicle, request, from the selected fleet vehicle, updated vehicle data,
        transmit vehicle data for the selected fleet vehicle from the central computer to the fleet vehicle access application,
        receive no response from the selected fleet vehicle and determine that the selected fleet vehicle is non-communicative, and
        transmit a request for a license plate number of the selected fleet vehicle to the fleet vehicle access application.

2. The system of claim 1, wherein the central computer is further configured to identify a subset of fleet vehicles in proximity to the device location.

3. The system of claim 1, wherein the mobile device includes an attachment mechanism configured for temporarily attaching the mobile device to an exterior surface of the selected fleet vehicle, and wherein the mobile device is attached to the selected fleet vehicle via the attachment mechanism.

4. The system of claim 3, wherein the mobile device is further configured to:
    receive the vehicle data at the fleet vehicle access application, and
    display the vehicle data on a mobile device screen.

5. The system of claim 4, wherein the mobile device is further configured to transmit a vehicle access request for operator access to an interior cabin of the selected fleet vehicle and for operator access to a secured interior compartment of the selected fleet vehicle.

6. The system of claim 5, wherein the secured interior compartment encloses a fleet vehicle on/off switch and an external controller connection port.

7. The system of claim 1, wherein the selected fleet vehicle is non-communicative and non-responsive to an updated vehicle data request from the central computer.

8. The system of claim 7, wherein the mobile device is further configured to:
    scan a license plate of the selected fleet vehicle and generate a license plate number, and
    transmit the license plate number and the device location to the central computer.

9. The system of claim 8, wherein the central computer is further configured to update a selected fleet vehicle location to the device location, and wherein the vehicle data includes last received vehicle data for the selected fleet vehicle.

10. A method for fleet-connected vehicle identification, comprising:
    receiving a mobile device connection request at a central computer via a fleet vehicle access application on a mobile device;
    determining a device location of the mobile device, wherein determining the device location includes utilizing signal strength of a plurality of wireless signals at the mobile device;
    receiving a vehicle data request from the mobile device at the central computer via the fleet vehicle access application;
    identifying a plurality of fleet vehicles in proximity to the device location;
    determining that a first fleet vehicle of the plurality of fleet vehicles is in closest proximity to the device location, wherein determining that the first fleet vehicle is in closest proximity to the device location includes utilizing signal strength of the plurality of wireless signals at the first fleet vehicle;

transmitting vehicle data for the first fleet vehicle from the central computer to the fleet vehicle access application;

requesting updated vehicle data from the first fleet vehicle;

receiving no response from the first fleet vehicle and determining that the first fleet vehicle is non-communicative; and transmitting a request for a license plate number of the first fleet vehicle to the fleet vehicle access application.

11. The method of claim 10, further comprising receiving from the mobile device a vehicle access request for operator access to an interior cabin of the first fleet vehicle and for operator access to a secured interior compartment of the first fleet vehicle.

12. The method of claim 11, further comprising providing operator access to the interior cabin and the secured interior compartment, wherein providing access to the secured interior compartment includes providing access to a vehicle on/off switch for the first fleet vehicle and an external controller connection port for the first fleet vehicle.

13. The method of claim 10, further comprising:

receiving a scan of a first fleet vehicle license plate from the fleet vehicle access application;

determining the license plate number; and updating a first fleet vehicle location to the device location;

and wherein transmitting the vehicle data from the central computer includes transmitting last received vehicle data for the first fleet vehicle.

14. The method of claim 10, further comprising:

receiving a relocation request for the first fleet vehicle to drive to a selected location in a facility, evaluating the relocation request, and transmitting a command to the first fleet vehicle to drive to the selected location.

15. A method for fleet-connected vehicle identification, comprising:

receiving, from a mobile device, a mobile device connection request at a fleet vehicle access application;

determining a device location of the mobile device, wherein determining the device location includes utilizing signal strength of a plurality of wireless signals at the mobile device;

receiving a vehicle data request at the fleet vehicle access application for a selected fleet vehicle in close proximity to the device location;

transmitting the vehicle data request to a central computer for identification of the selected fleet vehicle;

receiving vehicle data for the selected fleet vehicle at the fleet vehicle access application;

displaying the vehicle data in the fleet vehicle access application on a mobile device screen; and receiving a request for a license plate number of the selected fleet vehicle at the fleet vehicle access application.

16. The method of claim 15, further comprising:

scanning a selected fleet vehicle license plate using a mobile device camera, determining the license plate number, and transmitting the license plate number via the fleet vehicle access application to the central computer, wherein receiving the vehicle data for the selected fleet vehicle includes receiving last received vehicle data for the selected fleet vehicle.

17. The method of claim 15, wherein the vehicle data includes a vehicle service checklist, and further comprising:

displaying the vehicle service checklist in the fleet vehicle access application on the mobile device screen;

receiving, from the central computer, updated vehicle data indicating that a first service request on the vehicle service checklist has been completed; and indicating on the vehicle service checklist displayed on the mobile device screen that the first service request was completed.

18. The method of claim 15, further comprising:

transmitting, from the fleet vehicle access application, an access request for operator access to an interior cabin of the selected fleet vehicle and for operator access to a secured interior compartment of the selected fleet vehicle, wherein access to the secured interior compartment includes access to a vehicle on/off switch for the selected fleet vehicle and access to an external controller connection port for the selected fleet vehicle.

* * * * *